(12) United States Patent
Yan

(10) Patent No.: US 11,253,127 B2
(45) Date of Patent: Feb. 22, 2022

(54) CLEANING WHEEL STRUCTURE

(71) Applicant: Jason Yan, New Taipei (TW)

(72) Inventor: Jason Yan, New Taipei (TW)

( * ) Notice: Subject to any disclaimer, the term of this patent is extended or adjusted under 35 U.S.C. 154(b) by 108 days.

(21) Appl. No.: 16/737,078

(22) Filed: Jan. 8, 2020

(65) Prior Publication Data

US 2021/0100420 A1     Apr. 8, 2021

(30) Foreign Application Priority Data

Oct. 3, 2019   (TW) .................................. 108135818

(51) Int. Cl.
| | | |
|---|---|---|
| *A47L 11/283* | (2006.01) | |
| *A47L 11/40* | (2006.01) | |
| *A47L 11/282* | (2006.01) | |
| *A47L 11/24* | (2006.01) | |
| *A46B 5/00* | (2006.01) | |

(52) U.S. Cl.
CPC ........ *A47L 11/4038* (2013.01); *A46B 5/0041* (2013.01); *A46B 5/0062* (2013.01); *A46B 5/0087* (2013.01); *A47L 11/24* (2013.01); *A47L 11/282* (2013.01); *A47L 11/283* (2013.01); *A47L 2201/00* (2013.01)

(58) Field of Classification Search
CPC .... A47L 11/24; A47L 11/283; A47L 11/4038; A47L 2201/00; A46B 5/0041; A46B 5/0058; A46B 5/0062; A46B 5/007; A46B 5/0083; A46B 5/0087; A46B 5/0091
See application file for complete search history.

(56) References Cited

U.S. PATENT DOCUMENTS

| | | | | |
|---|---|---|---|---|
| 366,790 | A | * 7/1887 | Orther | F16C 11/0633 15/144.2 |
| 1,537,279 | A | * 5/1925 | Wolfe | A47L 11/4038 464/95 |
| 5,551,115 | A | * 9/1996 | Newville | A46B 5/0095 15/143.1 |
| 6,341,401 | B1 | * 1/2002 | Lin | A47L 13/144 15/119.2 |
| 2004/0064909 | A1 | * 4/2004 | Locklear | A46B 9/025 15/160 |
| 2015/0182090 | A1 | * 7/2015 | Park | A47L 11/4063 15/98 |
| 2018/0228334 | A1 | * 8/2018 | Kaleta | A47L 11/4075 |

* cited by examiner

*Primary Examiner* — Randall E Chin
(74) *Attorney, Agent, or Firm* — Muncy, Geissler, Olds & Lowe, P.C.

(57) ABSTRACT

A cleaning wheel structure, which mainly comprises a cleaning unit, a universal joint and an elastic element, wherein the cleaning unit comprises a plurality of clamping jaws disposed around the circumference of the shaft thereof, and each of the clamping jaws has a positioning groove, the universal joint is disposed between the plurality of clamping jaws, the elastic element is disposed between the universal joint and the cleaning unit, wherein the outer surface of the universal joint is convexly provided with a positioning portion for embedding with the positioning grooves, with the above structure, when the cleaning unit is stuck and cannot be driven to rotate by the universal joint, the positioning portion repeatedly pushes each of clamping jaws outwardly to rotate and to be embedded in the next positioning groove, so that the universal joint no longer drives the cleaning unit.

8 Claims, 4 Drawing Sheets

CLEANING WHEEL STRUCTURE

BACKGROUND OF THE INVENTION

Field of the Invention

The invention relates to a cleaning wheel of a cleaning robot, particularly, to a cleaning wheel structure which is simple in structure that allows easy assembly without being stuck.

Description of the Prior Art

A cleaning robot is a cleaning machine which can autonomously move, plan the path, and turn itself away when it encounters an obstacle, the cleaning robot can provide different type of cleaning methods, which can be divided into the sweeping or mopping mode according to the mounted cleaning unit such as the cleaning brush or the cleaning cloth.

However, when the cleaning robot is sweeping or mopping the floor, the cleaning cloth or brush of the cleaning robot can be caught in the gap between an object and the floor or the wall. At this time, the motor installed in the cleaning robot will continue to drive the cleaning brush or cloth to rotate, thereby causing the structure of the cleaning brush or cloth connected to the cleaning robot to be damaged by force.

As mentioned above, there are still quite a few problems with the prior art cleaning robot. Therefore, in view of the above-mentioned problems, the inventor of this invention has finally succeeded to developing the cleaning wheel structure after years of painstaking research and efforts.

SUMMARY OF THE INVENTION

In order to solve the above problems of the prior art, it is an object of the present invention to provide a cleaning wheel structure which is simple in structure and easy to install.

In order to solve the above problems of the prior art, it is another object of the present invention to provide a cleaning wheel structure that won't be easy to get stuck when the cleaning robot is moving.

In order achieve the above objects, the present invention provides a cleaning wheel structure mainly comprising a cleaning unit, an elastic element and a universal joint, wherein the cleaning unit is disposed with a plurality of clamping jaws around the circumference of a shaft of an upper surface thereof, the universal joint comprises a main body and a docking portion, the main body is engaged between the plurality of the clamping jaws, the docking portion is disposed on a top surface of the main body, and the bottom of the main body has a positioning hole concavely disposed in the main body, and the elastic element is disposed between the positioning hole of the universal joint and the shaft of the upper surface of the cleaning unit.

Each of the clamping jaws has a positioning groove, a circumference of the main body of the universal joint is convexly provided with a plurality of positioning portions corresponding to the positioning grooves, and the plurality of positioning portions is extended from the circumference of the main body along the curved surface toward the bottom of the main body.

The circumference of the bottom surface of the main body of the universal joint is concavely disposed with a plurality of concave portions facing upward and corresponding to the positioning portion.

The cleaning unit is a cleaning brush or a rotating disc.

The shaft of the upper surface of the cleaning unit is provided with an arc for the elastic element to be sleeved thereon, the central position of the top surface of the universal joint is provided with a convex portion for the elastic element to be sleeved thereon.

The cleaning unit is a cleaning brush of the cleaning robot or a rotating disc for mounting the cleaning cloth to perform a mopping action.

The elastic element is a spring or an elastic telescopic sleeve.

BRIEF DESCRIPTION OF THE DRAWINGS

The disclosure of present invention would be more understandable from the detailed description given herein below and the accompanying figures are provided for better illustration, and thus description and figures are not to limit the present invention, and wherein.

REFERENCE NUMERALS

Figure 1:
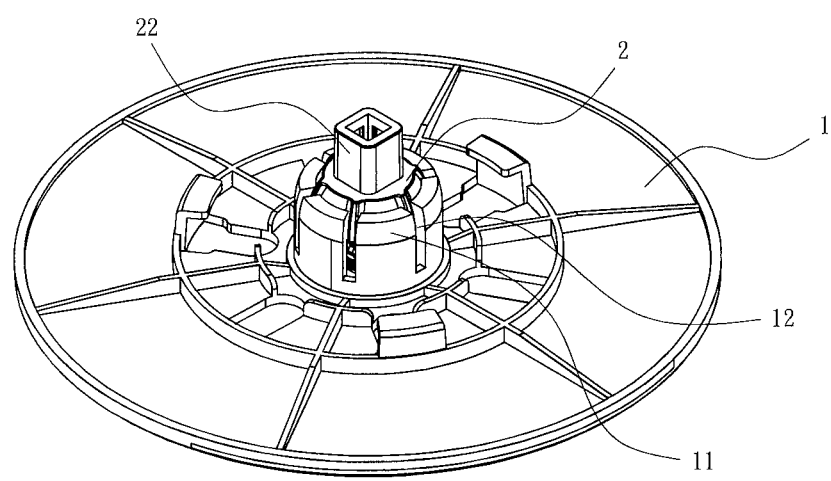
FIG. 1 illustrates a 3D perspective view of a cleaning wheel structure of the present invention.

1 cleaning unit
11 clamping jaw
12 positioning groove
2 universal joint
21 main body
211 positioning portion
212 concave portion
213 concave portion
22 docking portion
3 elastic element

DETAILED DESCRIPTION OF THE INVENTION

Figure 2:
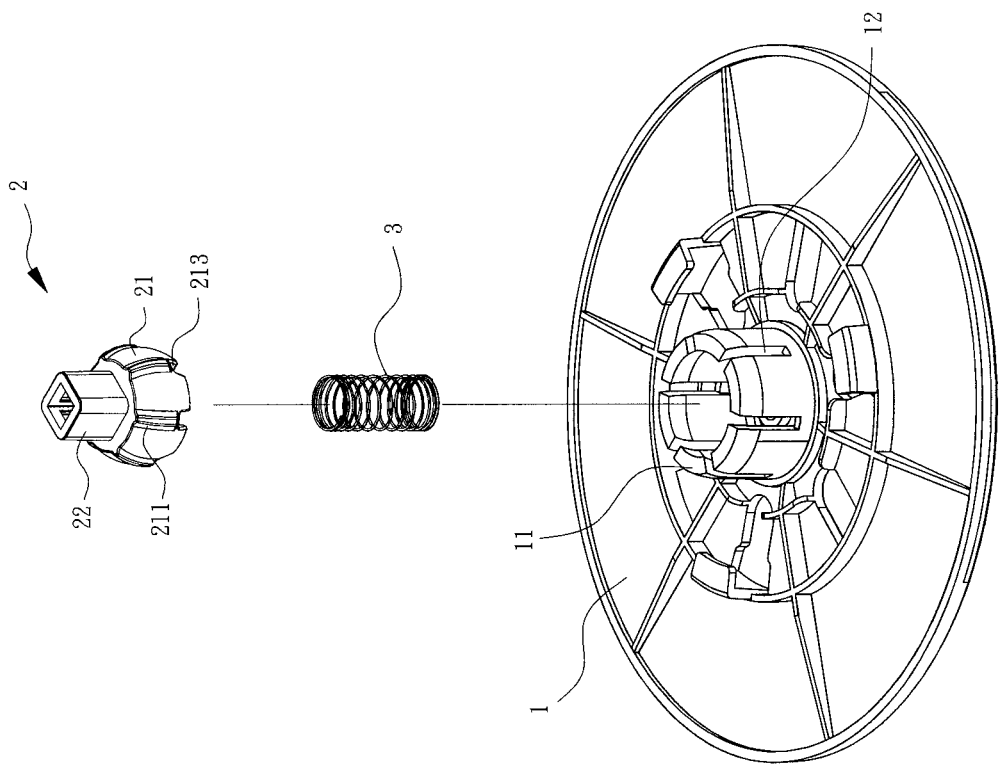
FIG. 2 illustrates a 3D explosive view of a cleaning wheel structure of the present invention.
Figure 3:
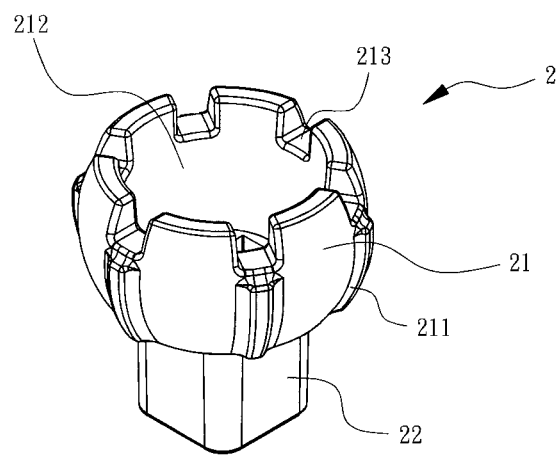
FIG. 3 illustrates a 3D perspective view of the universal joint of the cleaning wheel structure of the present invention from another view angle.
Figure 4:
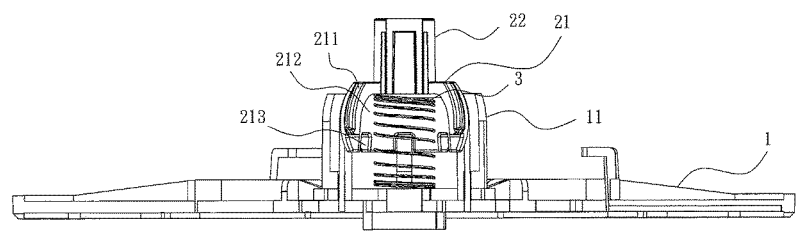
FIG. 4 illustrates a side cross-sectional view of the cleaning wheel structure of the present invention.

Referring to FIG. 1 to FIG. 4 for an embodiment of a cleaning wheel structure provided by the present invention, the cleaning wheel structure provided by the present invention comprises a cleaning unit 1, a universal joint 2 and an elastic element 3. In this embodiment, the cleaning unit 1 is a rotating disk of a cleaning robot (not shown) for mounting a cleaning cloth (not shown) for performing a mopping action, and the elastic unit 3 is a spring, wherein the cleaning unit comprises a plurality of clamping jaws 11 disposed around the circumference of a shaft of an upper surface thereof, and each of the clamping jaws comprises a curved surface facing the shaft of the cleaning unit, and each of the clamping jaws 11 has a positioning groove 12 disposed between the clamping jaws 11.

When assembling the cleaning wheel structure provided by the present invention, the elastic element 3 is placed at the shaft position of the upper surface of the cleaning unit 1, and the bottom surface of the elastic element 3 is abutted against the upper surface of the shaft the cleaning unit 1 and then the universal joint 2 is placed between the clamping jaws 11 of the cleaning unit 1, and the upper wall of the positioning hole 212 abuts against the top surface of the elastic element 3. At this time, the universal joint 2 is pushed up by the elastic force of the elastic element 3, so that the curved surface of the outer edge of the universal joint 2 is moved along the clamping jaws 11 toward the cleaning unit 1, and at the same time, the plurality of positioning portions 211 on the outer edge of the universal joint is respectively embedded to the positioning grooves 12 between the clamping jaws 11, and then the cleaning cloth is wrapped around the cleaning unit 1, and finally the docking portion 22 of the universal joint 2 is docked with the cleaning robot to secure the cleaning wheel structure provided by the present invention to the cleaning robot.

When the cleaning robot is moving, the cleaning robot drives the universal joint 2 through the structure that is docked with the docking portion 22; and while the universal joint 2 is embedded to the positioning groove 12 of the clamping jaws 11 of the cleaning unit 1 through the positioning portions 211 on the circumference of the universal joint 2, the structural strength between the universal joint 2 and the cleaning unit 1 drives the cleaning unit 1 to rotate as well, thereby allowing the cleaning cloth covering the cleaning unit 1 to wipe and to clean the ground.

When the cleaning robot is moving and encountering a ground surface that is uneven or has a small step difference, the cleaning unit 1 adjusts the distance between the universal joint 2 and the cleaning unit 1 by the elastic force of the elastic element 3 to adapt to the current ground conditions.

In addition, during the process of cleaning or mopping floor, when the cleaning unit 1 stops rotating due to the cleaning cloth caught by the gap between the object and the floor or the wall, at this time, with the configuration of positioning grooves 12 between the clamping jaws 11 of the cleaning unit 1, a certain elasticity remains when the clamps jaws 11 hold the universal joint 2, so that when the cleaning unit 1 gets stuck and stops rotating, the universal joint 2 driven by the cleaning robot can use the rotating force to push away the clamping jaws 11 through the positioning portions 211 on the outer circumference thereof, then the universal joint 2 can rotate to the next position to have each positioning portion 211 engaged with the next positioning groove 12. Repeat the operation of continuously rotating the universal joint 2 and pushing away the clamping jaws 11 by the positioning portions 211 and engaging the positioning portions 211 with the next positioning grooves, the universal joint can no longer drive the cleaning unit to rotate, thereby preventing the cleaning robot from rotating the cleaning unit 1 due to the continuous application of the rotational force when the cleaning unit 1 gets stuck, and thus solving the problem of continuous rotation that could break the docking connection in the prior art.

In addition, in the cleaning wheel structure provided by the present invention, a docking structure (not shown) may be respectively disposed on the upper wall of the positioning hole 212 of the universal joint 2 and the shaft position of the upper surface of the cleaning unit 1 for the top surface and the bottom surface of the elastic element 3 to be engaged therewith, thereby fixing the elastic element 3 between the cleaning unit 1 and the universal joint 2.

Further, in the cleaning wheel structure provided by the present invention, the circumference of the bottom surface of the main body 21 of the universal joint 2 is disposed with a plurality of concave portions 213 being concaved toward and corresponding to the positioning portions 211, wherein the concave portions 213 can stop the cleaning unit 1 to rotate when the cleaning cloth gets stuck. In addition, during the process of the cleaning robot continuously rotating the universal joint 2, the outer circumference of the universal joint 2 can generate an elastic force to allow the outer circumference of the universal joint 2 to move toward the center of the positioning hole 212, thereby allowing the positioning portions 211 of the universal joint 2 to push away the clamping jaws 11 through the elastic force between them and allowing the universal joint 2 to continue to rotate.

The present invention has been described with preferred embodiment of the present invention; however, this embodiment is not intended to limit the scope of the patent of the present invention. Many changes and modifications in the above described embodiment of the invention can, of course, be carried out without departing from the scope thereof.

What is claimed is:

1. A cleaning wheel structure comprising:
    a cleaning unit, wherein the cleaning unit comprises a plurality of clamping jaws disposed around the circumference of a shaft of an upper surface thereof, and each of the clamping jaws has a positioning groove;
    a universal joint, wherein the universal joint comprises a main body and a docking portion, the docking portion is disposed on a top surface of the main body, the main body is engaged between the plurality of the clamping jaws, and the bottom of the main body has a positioning hole concavely disposed in the main body, and a circumference of the main body is convexly provided with a plurality of positioning portions corresponding to the positioning grooves; and
    an elastic element disposed between the positioning hole of the universal joint and the shaft of the upper surface of the cleaning unit.

2. The cleaning wheel structure as claimed in claim 1, wherein a top surface of the elastic element is abutted against the surface of the upper edge of the positioning hole, and a bottom surface of the elastic element is abutted against the shaft of the upper surface of the cleaning unit.

3. The cleaning wheel structure as claimed in claim 1, wherein the main body comprises a circumference having an arc-shaped surface, and the plurality of positioning portions is extended from the circumference of the main body along a curved surface toward the bottom of the main body.

4. The cleaning wheel structure as claimed in claim 1, wherein the main body of the universal joint is concavely disposed with a plurality of concave portions at the circumference of the bottom surface corresponding to the positioning portion.

5. The cleaning wheel structure as claimed in claim 1, wherein the cleaning unit is a cleaning brush or a rotating disc.

6. The cleaning wheel structure as claimed in claim 1, wherein the shaft of the upper surface of the cleaning unit is provided with an arc for the elastic element to be sleeved thereon.

7. The cleaning wheel structure as claimed in claim 1, wherein a central position of the top surface of the universal joint is provided with a convex portion for the elastic element to be sleeved thereon.

8. The cleaning wheel structure as claimed in claim 1, wherein the elastic element is a spring or an elastic telescopic sleeve.

* * * * *